United States Patent [19]

Lalancette

[11] 4,124,683

[45] Nov. 7, 1978

[54] RECOVERY OF MAGNESIUM FROM MAGNESIUM SILICATES

[75] Inventor: Jean-Marc Lalancette, Sherbrooke, Canada

[73] Assignee: Universite de Sherbrooke, Quebec, Canada

[21] Appl. No.: 838,220

[22] Filed: Sep. 30, 1977

[51] Int. Cl.$^2$ .............................................. C01F 5/40
[52] U.S. Cl. ................................................... 423/166
[58] Field of Search .................. 423/519, 512 A, 554, 423/521, 638, 173, 158, 166

[56] References Cited

U.S. PATENT DOCUMENTS

| | | | |
|---|---|---|---|
| 1,865,224 | 6/1932 | Winston et al. | 423/554 |
| 2,112,903 | 4/1938 | Booth | 423/431 |
| 2,384,010 | 9/1945 | Brandenburg | 423/554 |
| 4,058,587 | 11/1977 | Nelson | 423/220 |

FOREIGN PATENT DOCUMENTS

74/1,871  3/1974  South Africa.

OTHER PUBLICATIONS

Lewis, "Some Practical Suggestions on Waste Acid Treatment," Rock Products (Jun., 1949), pp. 117–119, 149, 150.

*Primary Examiner*—O. R. Vertiz
*Assistant Examiner*—Wayne A. Langel
*Attorney, Agent, or Firm*—Cushman, Darby & Cushman

[57] ABSTRACT

Substantially pure magnesium hydroxide or carbonate is obtained from naturally-occurring minerals containing at least 10% magnesium silicate by adjusting the pH a magnesium bisulfite solution obtained therefrom to between 8.0 and 8.9 under an oxidizing atmosphere thereby to produce a magnesium sulfate solution from which the magnesium hydroxide or carbonate can be readily obtained.

4 Claims, No Drawings

RECOVERY OF MAGNESIUM FROM MAGNESIUM SILICATES

The present invention relates to a process for recovering substantially pure magnesium hydroxide or carbonate from naturally occurring minerals containing magnesium silicate.

PRIOR ART

The possibility of a reaction of naturally occurring silicates of magnesium with sulfur dioxide in the presence of water is known, reference to such a reaction being made in early patents, such as U.S. Pat. No. 690,513, Jan. 7, 1902. This reaction is possible because $SO_2$ in water is a much stronger acid than silicic acid. Depending on the relative amount of sulfur dioxide and magnesium silicate, the sulfite or the bisulfite can be obtained. With an excess of $SO_2$, the bisulfite is formed. Thus, with chrysotile, the following reaction is observed:

$$3MgO \cdot 2SiO_2 \cdot 2H_2O + SO_2/H_2O(excess) \rightarrow 3Mg(HSO_3)_2 + 2SiO_2 \downarrow$$

Mg bisulfite    insoluble silica

On the other hand, if the magnesium silicate is in excess, then the sulfite rather than the bisulfite is the final product:

$$3MgO \cdot 2SiO_2 \cdot 2H_2O(excess) + 3SO_2/H_2O \rightarrow 3MgSO_3 + 2SiO_2 \,_K$$

In fact, a solution of bisulfite in water has the tendency to be transformed into a solution of sulfite by loss of sulfur dioxide, if the solution is aerated, in order to remove the free $SO_2$. Also the treatment of a solution of sulfite by $SO_2$ will allow the formation of the corresponding bisulfite, thus showing clear by the equilibrium which exists between these species, as shown by the following equation:

$$Mg(HSO_3)_2 \rightleftarrows MgSO_3 + SO_2 + H_2O$$

Sulfur dioxide is a most interesting material for the extraction of magnesium from mineral sources of this metal because it can be prepared on site by the combustion of sulfur, a very abundant and cheap material or recovered from the roasting operations of sulfides which are very common in the mining industry. The processing of crude petroleum and the treatment of flue gas from the combustion of coal are also important sources of sulfur or sulfur dioxide.

The silicates which contain magnesium are numerous and of frequent occurrence. The common mineral species containing significant amounts of magnesium bounded to silica are listed in the following Table I:

TABLE I

| Name | SILICATES OF MAGNESIUM Formula | % Mg |
|---|---|---|
| Serpentine | $Mg_6(Si_4O_{10})(OH)_8$ | 26 |
| Talc | $Mg_3(Si_4O_{10})(OH)_2$ | 19 |
| Phlogopite | $KMg_3(AlSi_3O_{10})(OH)_2$ | 17 |
| Biotite | $K(Mg,Fe)_3(AlSi_3O_{10})(OH)_2$ | 13 |
| Chrysolite (olivine) | $(Mg,Fe)_2SiO_4$ | 23 |
| Pyrope (garnet) | $Mg_3Al_2(SiO_4)_3$ | 15 |
| Enstatite (pyroxene) | $Mg_2(Si_2O_6)$ | 24 |
| Diopside | $CaMg(Si_2)_6$ | 11 |
| Chlorite | $Mg_3(Si_4O_{10})(OH)_2Mg_3(OH)_6$ | 32 |
| Tremolite | $Ca_2Mg_5(Si_8O_{22})(OH)_2$ | 15 |
| Anthophyllite | $(Mg,Fe)_7(Si_8O_{22})(OH)_2$ | 20 |

In the case of serpentine, large amounts of the incorporated fibrous chrysotile ($3MgO \cdot 2SiO_2 \cdot 2H_2O$) are mined for the obtention of the fibrous material, asbestos. Also, the amphibole variety of silicates have led to the extraction of fibers mainly of crodicolite and amosite ($5.5FeO$, $1.5MgO$, $8SiO_2 \cdot H_2O$) varieties.

In most if not all of the mineral operations where the above silicates are involved, large amounts of rocks rich in magnesium have to be crushed in order to obtain the desired product, such as asbestos fiber, talc or simply aggregate for concrete. For example, in the case of chrysotile asbestos, the annual production of this material in Canada is of the order of 1.5 million tons per year. Since the fiber represents about 5% of the weight of the rocks involved in the extraction, the total mass of mineral which is grounded in the course of the extraction is in the range of 30 million tons per year. The granulometry of the waste rocks or tailings, varies greatly but a significant portion, between one and five percent, is already very finely grounded. Even if only one tenth of one percent is in the appropriate form for digestion by $SO_2$ for the extraction of magnesium the amount of silicate thus made available, 30,000 tons, appears very important. At the present time, there is no use for such tailings. In fact, specially with the finely divided material, there is an environmental problem created by dust and an expenditure to carry these tailings on top of huge piles of wastes. Consequently, the cost of finely divided serpentine at the outlet of an asbestos mine is minimal, if not negative.

The chemistry of the sulfite or bisulfite of magnesium shows that this material can be transformed into several magnesium derivatives having useful properties. By thermal decomposition, the sulfite can lead to the formation of magnesium oxide with evolution of $SO_2$. In the course of this process however, some sulfite is transformed into sulfate:

$$MgSO_3 \rightarrow MgO + SO_2 \uparrow$$

By exchange with calcium chloride, the sulfite can give magnesium chloride:

$$MgSO_3 + CaCl_2 \rightarrow CaSO_3 \downarrow + MgCl_2$$

The magnesium hydroxide can be formed by treatment of the sulfite with a strong base, such as NaOH. Further heat treatment of $Mg(OH)_2$ leads to magnesium oxide:

$$MgSO_3 + 2NaOH \rightarrow Mg(OH)_2 \downarrow + Na_2SO_3$$

$$Mg(OH)_2 \rightarrow MgO + H_2O$$

The carbonate can be obtained through a similar exchange reaction:

$$MgSO_3 + Na_2CO_3 \rightarrow MgCO_3 \downarrow + Na_2SO_3$$

All these reactions are well known and do not represent a novelty in the area of extraction and transformation of magnesium salts but show the interest of magnesium sulfite or even sulfate as a starting material for the formation of magnesium salts.

Many uses for the magnesium salts, MgO, Mg(OH)$_2$, MgCl$_2$, MgCO$_3$, MgSO$_4$, require a product of very high degree of purity. For example a very important use of magnesium oxide is in the manufacture of refractory material. The presence of a few percent of impurities in the oxide modifies the resistance of MgO to high temperature in a very adverse way and renders the material useless as refractory. The usual impurities are calcium oxide, aluminum oxide and iron oxides (either ferrous or ferric). In TRAITE DE CHIMIE MINERALE, Paul BAUD, TOMEI, p. 115, 1951 it is shown that the presence of small amounts of contaminants decreases the melting temperature of the magnesium oxide by several hundred degrees. Another area where the purity of the magnesium salt is critical is the formation of the metal by the electrolysis of magnesium chloride.

These two examples from areas representing major uses for magnesium illustrate the need for very pure magnesium salts.

The naturally occurring magnesium silicates are very seldom in the pure state when found in nature. The secondary metals can be either part of the stoichiometry of the silicate of magnesium or simply mixed with the silicate. For example, chrysotile wastes 3MgO.2SiO$_2$.2H$_2$O, are contaminated by 6% by weight of iron, plus traces of nickel and chrome. Also, up to one percent of calcium can be found in many samples. In the case of chrysotile, the iron is mixed with crystal, in a very intimate manner, but not chemically combined to the main structure of the silicate. In other instances, for example with amosite, another variety of asbestos, (5.5FeO, 1.5MgO, 8SiO$_2$.H$_2$O) the iron is part of the crystal structure. In practice, many of the silicates containing magnesium are metamorphic rocks, which implies that there is always a certain amount of substitution of magnesium by another metal such as iron, calcium or aluminum. A good illustration of this situation is given by the formula of biotite K(Mg,Fe) (AlSi$_3$O$_{10}$) (OH)$_2$ or phlogopite KMg$_3$ (AlSi$_3$O$_{10}$) (OH)$_2$.

When sulfur dioxide is used in combination with water, to leach magnesium from a silicate, all the other metals present, either combined or mixed, such as calcium and iron are dissolved at the same time. And the crude sulfite solution, thus obtained, contains such impurities as calcium and iron which render the crude sulfite improper to be used as a source of pure magnesium compound.

The problem of obtaining a pure magnesium compound from SO$_2$ leaching is well illustrated by the patent of Trubey, et al, U.S. Pat. No. 3,085,858, Apr. 16, 1963. In the case of this patent, the leaching was done by SO$_2$ on dolomite, a natural mixture of calcium oxide and magnesium oxide rather than on a silicate. This patent reports that even with this simple source of magnesium, 3% of CaO was contaminating the magnesium oxide after processing, in spite of careful precautions not to leach calcium in the course of the digestion of the mineral. The approach of Trubey which controls the presence of calcium by using a stream of CO$_2$ cannot be applied to eliminate iron, heavy metals and aluminum from a solution of crude sulfite of magnesium as obtained from naturally occurring silicates.

SUMMARY OF THE INVENTION

The object of the present invention is related to the treatment of the crude solution of the SO$_2$-leached magnesium obtained from a silicate and contaminated by all the minor components of a natural silicate namely sodium, potassium, calcium, iron, aluminum traces of heavy metals such as chrome and nickel, in order to remove these impurities and to obtain a magnesium compound of very high purity.

In accordance with the present invention, there is now provided an improved process for recovering substantially pure magnesium hydroxide or magnesium carbonate from naturally-occurring minerals containing magnesium silicate. The improved process of the present invention comprises digesting an aqueous suspension of a naturally-occurring mineral containing magnesium silicate with sulfur dioxide to produce a crude solution of magnesium bisulfite, adjusting the pH of said magnesium bisulfite solution to between 8.0 and 8.9 under an oxidizing atmosphere thereby to precipitate the impurities contained therein and causing the magnesium bisulfite to be converted to magnesium sulfate and precipitating the magnesium as magnesium hydroxide or carbonate by adjusting the pH of the magnesium bisulfite solution to between 9.5 and 10.5 with an alkali metal hydroxide or by treatment with an alkali metal carbonate, and recovering the substantially pure magnesium hydroxide or carbonate thus produced.

A main feature of the present invention is that the metallic contaminants found in naturally-occurring minerals containing magnesium silicate can be selectively precipitated from a bisulfite solution obtained by leaching the naturally-occurring minerals by the adjustment of the pH in the range of 8.0 to 8.9 under an oxidizing atmosphere in opposition to prior art procedure where each contaminant has to be eliminated separately and where mixtures of magnesium sulfite and sulfate were found in the end product.

Another advantage of the present invention is that beside obtaining the desired salt of magnesium a good proportion of the starting sulfur dioxide can be recovered in the form of ammonium or alkali metal sulfate, the latter having well known commercial utilities.

A further advantage of the present invention is that since the process oxidizes the bisulfite formed to sulfate, the pollution problems generated by the handling of sulfites and recovery of sulfur dioxide are eliminated. It is generally known that release of sulfur dioxide is highly undesirable in industrial processes because of the adverse effect of sulfur dioxide on the environment.

The naturally-occurring mineral containing magnesium silicate which can be used in accordance is preferably one which contains at least 10% magnesium, and where the specific impurities such as calcium is not more than 20%, iron 15%, aluminum 10%, agglomerated chrome, nickel and cobalt 2%, while the total agglomerated alkali (Na and K) do not exceed 15%. Another feature of the starting mineral is that its mesh size should be smaller than 60 with a mesh size of at least 200 to 325 being preferred. It is possible to use a mineral containing less than 10% magnesium or having a mesh size greater than 60, but it should be appreciated that yield and purity of the magnesium compound obtained being of commercial importance, the exercise of the improved process of the present invention will be carried out under the preferred conditions which give the superior results.

The adjustment of the pH to from 8.0 to 8.9 is carried out with ammonium or alkali metal hydroxide such as sodium or potassium hydroxide. The preferred pH adjustment is about 8.5 and is carried out under an oxidizing atmosphere which is obtained by bubbling air or oxygen in the solution and in the presence of a strong base such as an alkali metal hydroxide whereby magnesium hydroxide is precipitated or an alkali metal carbonate whereby magnesium carbonate is precipitated. The cobalt or nickel present in the starting mineral will accelerate the oxidation of the bisulfite to sulfate.

In the final precipitation step the pH of the adjustment to from 9.5 to 10.5 with 9.8 to 10.2 being preferred is also carried with a strong base such as an alkali metal hydroxide whereby magnesium hydroxide is precipitated or an alkali metal carbonate whereby magnesium carbonate is precipitated.

DETAILED DESCRIPTION

Step 1 — DIGESTION OF THE MAGNESIUM-BEARING MINERAL BY SULFUR DIOXIDE IN THE PRESENCE OF WATER The naturally-occurring mineral containing magnesium silicate is a divided material with a mesh size smaller than 60 mesh. With a product larger than mesh 60, the reaction proceeds but in order to have a faster and more complete reaction, it is preferable to have a material finer than mesh 200. The volume of water present is also related to the ease of reaction. A ratio of mineral weight to volume of water that allows for the solubility of magnesium bisulfite is important. The reaction of digestion can be performed at atmospheric pressure or at a higher pressure. At atmospheric pressure, it is advisable to avoid too high temperatures, above 50° C., in order not to decrease the solubility of $SO_2$ in water. At 25° C., with a water ratio of 20 g of mineral (for example, serpentine) per liter of water the reaction is complete after, about, three hours. It is indicated, when the reaction nears completion, to stop the addition of $SO_2$. In that manner, all the remaining $SO_2$ present in solution reacts with the magnesium-bearing mineral to give a solution of bisulfite free of $SO_2$. This simplifies the environmental considerations related with the presence of $SO_2$.

When the digestion is completed, the reaction mixture is filtered to remove the silica and any unreacted solid material present. In that manner, a solution of bisulfite, sulfite and sulfate of magnesium and other metals present, such as calcium and iron is obtained. The digestion is done under very acidic conditions, the pH of the solution being kept in the range of 0.10 to 2.0 at this stage.

Step 2 — SELECTIVE PRECIPITATION OF METALLIC IMPURITIES FROM THE CRUDE SOLUTION The precipitation of the impurities from the bisulfite solution is done by transforming the sulfite or bisulfite into sulfate in an oxidizing atmosphere while increasing the pH of the solution in the range of 8.5 by addition of a strong base. The advantage of transforming the bisulfite into sulfate is to fall upon a stable and uniform type of anion at this stage. The solution of bisulfite is easily oxidized by air and this oxidation is much accelerated by the presence of traces of heavy metals, such as cobalt. Since the presence of some sulfate is unavoidable, it is simpler to proceed to full oxidation at this stage and thus avoid having a mixture of salts as the end products. In practice, it has been found that aeration of the solution of crude bisulfite for about one hour at room temperature allows the transformation of bisulfite to sulfate to be complete.

While this aeration is proceeding, the pH of the solution is raised to a value of 8.5 by addition of a basic reagent. Ammonia or an alkali metal hydroxide for example sodium hydroxide have proved to be appropriate base for this pH adjustment. Iron, calcium, aluminum and other heavy metals are thus precipitated at that pH. By filtration, they are eliminated and the clear solution which contains magnesium sulfate is obtained.

Step 3 — RECOVERY OF MAGNESIUM SALTS

The precipitation of magnesium hydroxide is obtained by further increase of the pH to 9.5–10.5 by a strong base such as an alkali metal or ammonium hydroxide. By filtration, very pure magnesium hydroxide is recovered, indicating a purity of over 99%. If magnesium carbonate is the desired product, this second raise of pH is replaced by addition of sodium carbonate.

Step 4 — RECOVERY OF SULFATES

When the magnesium salts have been recovered, there remains a solution of the sulfate of the base which has been used (sodium or ammonium) and the sulfate of the small amount of alkali metals present in the starting silicate. By evaporation of the filtrated, ammonium sulfate (or sodium sulfate) can be obtained.

The sequential operations are represented by the following Flowsheet I.

FLOWSHEET I

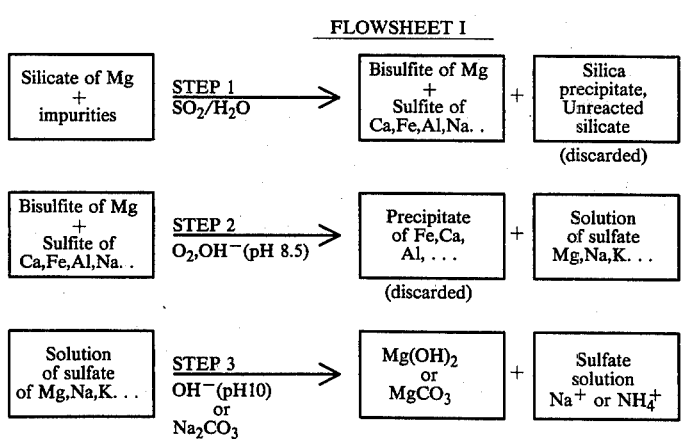

FLOWSHEET I

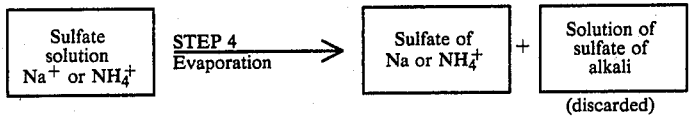

The present invention will be more fully understood by referring to the following Examples which are given to illustrate the invention rather than limit its scope.

EXAMPLE 1

In a 2 liter flask, a 40 g sample of chrysotile mesh + 200–325 is suspended in 1,500 ml of water. The atmosphere over the suspension is kept saturated with $SO_2$ and the liquid phase is strongly agitated at room temperature. After a contact of 3.5 hours, the suspension is filtered over asbestos.

The filtrate is then treated with sodium hydroxide (44 ml NaOH 10%) in order to bring the pH to 8.6. The solution is aerated as it is neutralized by a stream of air (150 ml/min), for 1.5 hour, in order to oxidize the bifulsite to sulfate.

After filtration, the pH of the sulfate solution of magnesium is raised to 9.9 by addition of 204.5 ml NaOH 10%. Magnesium hydroxide (15.6 g) is thus precipitated with a yield of 68% related to the amount of magnesium available in the starting material. The analysis of the precipitate gives 99.1% $Mg(OH)_2$.

By evaporation, 71.5 g of $Na_2SO_4.7H_2O$ is recovered, a yield of 82%.

A similar procedure is used for the other examples.

EXAMPLES 2–11

By proceeding in the same manner and using the conditions set forth in Table II, the results shown in Table II are obtained. It is noted that Example 8 is given to illustrate the decreased yield obtained with the process of the present invention when using a mineral wherein the magnesium content is less than 10% by weight.

TABLE II

| Ex. No. | Starting silicate | STARTING MATERIAL Weight (gm) | Composition (%) Mg | Fe | Ca | Al | Mesh size | STEP 1 SO$_2$ pH digestion | Duration digestion (hrs) | Base used | STEP 2 pH pption Fe,Ca,Al | Oxidant Atmosphere | Duration oxidation (hrs) | STEP 3 pH pption Mg(OH)$_2$* | Composition Mg(OH)$_2$* | YIELDS Mg(OH)$_2$ recovery (%)** | Sulfate recovery (%)**# |
|---|---|---|---|---|---|---|---|---|---|---|---|---|---|---|---|---|---|
| 1 | Serpentine (chrysotile) | 40 | 22 | 6.5 | 1.1 | 0.1 | +200–325 | 1.1 | 3.5 | NaOH | 8.6 | air | 1.5 | 9.9 | 99.1 | 68 | 82 |
| 2 | Serpentine (antigorite) | 45 | 22 | 6.5 | 1.1 | 0.1 | +325 | 1.0 | 3.0 | NaOH | 8.8 | air | 1.2 | 10.1 | 99.0 | 76 | 81 |
| 3 | Serpentine (chrysotile-antigorite) | 42 | 22 | 6.5 | 1.1 | 0.1 | +60–200 | 0.8 | 3.3 | NH$_4$OH | 8.5 | air | 1.4 | 10.0 | 99.1 | 78 | 76 |
| 4 | Serpentine (chrysotile-antigorite) | 20 | 23 | 5.9 | 0.8 | trace | +60–200 | 1.0 | 3.9 | NH$_4$OH | 8.6 | O$_2$ | 0.5 | 10.0 | 99.3 | 81 | 74 |
| 5 | Talc | 40 | 19 | 0.2 | 0.1 | — | +325 | 0.9 | 3.5 | NaOH | 8.4 | air | 1.2 | 9.8 | 99.6 | 86 | 81 |
| 6 | Talc | 40 | 19 | 0.2 | 0.1 | — | +325 | 0.8 | 3.1 | NH$_4$OH | 8.5 | O$_2$ | 1.1 | 9.9 | 99.5 | 88 | 77 |
| 7 | Phlogopite | 45 | 16 | 1.1 | 0.7 | 6.6 | +60–200 | 0.9 | 4.2 | NaOH | 8.4 | air | 1.5 | 10.1 | 99.0 | 69 | 82 |
| 8 | Amosite | 30 | 3.4 | 29 | 0.8 | 0.1 | +60–200 | 0.8 | 4.0 | NaOH | 8.6 | air | 2.0 | 10.0 | 97.2 | 32 | 80 |
| 9 | Diopside | 45 | 10 | 1.8 | 18 | 0.2 | +200–325 | 0.9 | 3.0 | NaOH | 8.4 | air | 2.0 | 9.9 | 99.0 | 63 | 82 |
| 10 | Biotite | 40 | 11 | 19 | 1.0 | 6.1 | +60–200 | 1.0 | 4.2 | NH$_4$OH | 8.6 | air | 1.5 | 10.0 | 99.0 | 64 | 71 |
| 11 | Chlorite | 25 | 28 | 5.1 | 1.2 | 0.3 | +200–325 | 0.9 | 3.5 | NH$_4$OH | 8.7 | air | 1.5 | 10.1 | 99.2 | 77 | 79 |

*Percent of Mg(OH)$_2$ in the final product.
**Percent yield of available salt in the starting product.
Sulfate of Na or NH$_4$ depending of base used.

EXAMPLE 12

By proceeding in the same manner as in Ex. 1–11 and substituting the appropriate amount of sodium carbonate for the sodium hydroxide in Step 2 there is obtained magnesium carbonate in substantially quantitative yields.

I claim:

1. In a process for the extraction of a magnesium compound from a naturally-occurring mineral containing at least 10% magnesium silicate, the improvement which comprises digesting an aqueous suspension of a naturally-occurring mineral containing at least 10% magnesium silicate with sulfur dioxide and recovering the crude solution of magnesium bisulfite thus obtained, and adjusting the pH of said magnesium bisulfite solution under an oxidizing atmosphere with ammonium hydroxide or an alkali metal hydroxide to a pH between 8 and 8.9 thereby to precipitate the impurities contained in the starting mineral and to obtain a substantially pure magnesium sulfate - containing solution, and recovering the magnesium-sulfate-containing-solution.

2. The process of claim 1, wherein the starting naturally-occurring mineral containing magnesiun has a mesh size smaller than 60 mesh.

3. The process of claim 1, wherein the starting silicate contains at least 10% by weight of magnesium and not more than 15% iron, 10% aluminum, 15% agglomerated alkali and 2% agglomerated chrome, nickel and cobalt.

4. The process of claim 1 wherein the digestion is carried out at a pH of 0.10 to 2.0.

* * * * *